(12) United States Patent
Kharkover et al.

(10) Patent No.: US 8,977,383 B2
(45) Date of Patent: Mar. 10, 2015

(54) MODULAR STORAGE SYSTEM

(71) Applicants: Ilia Kharkover, Kiryat Yam (IL); Yakov Monastyrsky, Kiryat Yam (IL)

(72) Inventors: Ilia Kharkover, Kiryat Yam (IL); Yakov Monastyrsky, Kiryat Yam (IL)

( * ) Notice: Subject to any disclaimer, the term of this patent is extended or adjusted under 35 U.S.C. 154(b) by 0 days.

(21) Appl. No.: 14/206,004

(22) Filed: Mar. 12, 2014

(65) Prior Publication Data

US 2014/0193225 A1 Jul. 10, 2014

Related U.S. Application Data

(62) Division of application No. 13/255,208, filed as application No. PCT/IL2010/000208 on Mar. 11, 2010, now Pat. No. 8,812,148.

(60) Provisional application No. 61/159,098, filed on Mar. 11, 2009.

(51) Int. Cl.
*G06F 7/00* (2006.01)
*E04H 6/22* (2006.01)
*E04H 6/28* (2006.01)
*E04H 6/42* (2006.01)
*B65G 1/06* (2006.01)

(52) U.S. Cl.
CPC .................. *E04H 6/22* (2013.01); *E04H 6/225* (2013.01); *E04H 6/282* (2013.01); *E04H 6/422* (2013.01); *B65G 1/06* (2013.01); *E04H 6/424* (2013.01)
USPC ........... 700/218; 414/800; 414/277; 414/227; 414/229

(58) Field of Classification Search
USPC ........................................................ 700/218
See application file for complete search history.

(56) References Cited

U.S. PATENT DOCUMENTS

| | | | |
|---|---|---|---|
| 5,165,842 A * | 11/1992 | Hammer | 414/800 |
| 5,467,561 A | 11/1995 | Takaoka | |
| 5,556,246 A | 9/1996 | Broshi | |
| 5,573,364 A | 11/1996 | Schneider et al. | |
| 5,669,753 A | 9/1997 | Schween | |
| 2002/0164234 A1* | 11/2002 | Haag | 414/277 |
| 2008/0014059 A1* | 1/2008 | Jones | 414/227 |
| 2009/0081011 A1* | 3/2009 | Kaufmann et al. | 414/229 |

OTHER PUBLICATIONS

International Search Report and Written Opinion dated Jul. 6, 2010 in corresponding International Application No. PCT/IL2010/000208.

* cited by examiner

*Primary Examiner* — Gene Crawford
*Assistant Examiner* — Kyle Logan
(74) *Attorney, Agent, or Firm* — The Law Office of Michael E. Kondoudis

(57) ABSTRACT

A modular system for storage of cargo units in a designated space. The modular system includes: a plurality of interconnected active cell units, each cell unit including a cell transporting mechanism with at least one active shuttle unit moveable between the plurality of cell units. Each shuttle unit includes a shuttle transporting mechanism adapted to transport at least one pallet of the plurality of pallets to and from one of the plurality of cell units and also to and from at least one shuttle unit. The system also includes a central controller adapted to control the operation of the cell and the shuttle transporting mechanisms, the operation of which is performed in an independent manner via the central controller such that a construction of any arrangement of the cell units is performed to effectively exploit a designated space.

22 Claims, 14 Drawing Sheets

MODULAR STORAGE SYSTEM

FIELD OF THE INVENTION

The present invention generally relates to a modular storage system, and more specifically, to system an automatic multi-dimensional parking system which enables effective exploitation of any available plot of land, or any other location.

BACKGROUND OF THE INVENTION

The problem of providing storage spaces (e.g., parking) for cargo (e.g., vehicles) is becoming increasingly serious. For example, there is a growing demand for parking spaces which is accompanied with a decrease in supply of land available for such parking spaces, particularly in densely populated areas.

Automated parking garage systems have been employed since the late 1950's utilizing crane systems, conveyers, hydraulics and pneumatics to transport and store vehicle within a parking structure. Recently, more advanced garage systems have been developed which include computer-controlled, specialized equipment for carrying vehicles to assigned parking spaces in a way similar to the way that computerized assembly lines or warehouses store and retrieve miscellaneous goods. In such assembly line and warehouse systems, a computer assigns a location for each item as it is received from its manufacturer, and robotic equipment carries each item to its assigned location. The same equipment is dispatched to the location when the item requires retrieval. Often, the items stored in a warehouse are placed on pallets to facilitate transportation and storage of the items. The use of pallets as supporting elements for the transport and storing of vehicles is also typical of more advanced automated parking garage systems.

Examples of automated parking garage systems are described in U.S. Pat. No. 5,467,561 of Takaoka, U.S. Pat. No. 5,556,246 of Broshi, U.S. Pat. No. 5,573,364 of Schneider et al., and U.S. Pat. No. 5,669,753 of Schween.

U.S. Pat. No. 5,467,561 discloses an automated high-raised parking system. The system has a parking construction including a parking rack structure having a plurality of stories of parking racks for parking an automobile as mounted on a pallet, a lift passage for a lift-translator device, the passage being formed besides the parking racks. The lift-translator device includes a lift table and a translator device. An automobile entrance/exit section is provided for allowing entrance and exit of the automobile to and out of the construction. A holding unit is provided at a predetermined height of the entrance/exit section for holding the pallet so as to maintain a horizontal posture of this pallet mounting the automobile. The automobile as mounted on the lift table is vertically moved to a predetermined rack and then translated by the translator device onto this rack. A turntable device is provided at the entrance/exit section. This device includes a turntable which swivellably holds the pallet mounting the automobile thereon so that an orientation of the automobile on the pallet is changed by swiveling this turn table, and includes also an elevator mechanism for elevating the turntable so as to allow an upward movement of the pallet relative to the height of the entrance/exit section.

U.S. Pat. No. 5,556,246 discloses an automated system for storing, retrieval and transporting of goods of any shape and size in aisleless warehouses, ships, airplanes, trains and the like. The system also provides aisleless warehouses, parking lots and the like and enables a computerized fully automated handling of stored items such as loading and evacuating of containers. The system provides the moving of the goods by placing same on pallets which travel on a flat and smooth floor. The pallet is provided with elastic air cushions which enable its hovering over the flat surface and a drive to enable the movement to any required direction.

U.S. Pat. No. 5,573,364 a parking system for a motor vehicle formed as a high-level rack storehouse including at least one rack-operating device for transporting a car, which is loaded on a pallet at a parking station, to one of a parking spot and an unparking station, and an arrangement for handling empty pallets and including a pallet-receiving device and a displaceable pallet-stacking device.

U.S. Pat. No. 5,669,753 An automated parking garage simultaneously parks and retrieves multiple vehicles. Each vehicle entering the facility is videotaped to make a record of its physical condition prior to entry into the garage to protect the garage owner from baseless damage claims. Vehicles are simultaneously measured and entry into the garage is denied to oversized vehicles. Upon being granted entry, a customer parks the customer's vehicle on a pallet near the garage entrance and leaves the facility. In single floor designs, the pallet is carried by a self-propelled carrier to a parking space by a series of longitudinal and transverse movements on rails. A multiple story embodiment employs a lifting device that includes a pallet support member that shuttles back and forth between two contiguous floors. Each pallet is carried by a carrier to a lifting device and each lifting device has mechanical arms that support the carrier until the pallet support member deploys and independently supports the pallet to enable withdrawal of the carrier from the lifting device. Another carrier, stationed on an upper floor, retrieves the vehicle-supporting pallet from the lifting device and delivers it to its assigned parking space. Insertion and retrieval of multiple vehicles occurs simultaneously so that the formation of queues of vehicles entering the facility is minimized.

A main shortcoming of the existing systems for storage of cargo is their complexity and flexibility which result in a non-efficient exploitation of existing designated storage space. These systems are usually pre-fabricated, and therefore their flexibility is limited.

One of the most important directions towards solving the parking space problem is creating less expensive and easily realized various types of semi-automatic and automatic parking systems of small and medium capacity (e.g., 6-120 places) that could be installed in any predetermined site and/or location which is characterized by a regular or irregular form. This should be performed easily, without the need for special design and manufacturing of such systems.

Therefore, it is long felt need to develop a storage system which is: easy for constructions, cable of providing storage space for any specific number of cargo units, reliable, capable of exploiting any designated space, capable of providing any 2D and 3D structure, fast and cost-effective. The present invention is intended to comply with all these requirements.

SUMMARY OF THE INVENTION

It is one object of the present invention to provide a modular system for storage of cargo units in a designated space and for effective exploitation of the designated space. The system comprises:
a. A plurality of pallets. Each pallet of the plurality of pallets is adapted to carry at least one cargo unit.
b. A plurality of at least partially interconnected active cell units forming a multi-dimensional structure with at least one row and at least one column of storing locations for at least one of the cargo units; the at least one row of the multi-dimensional structure is parallel to the to an axis selected from axis X or axis Y, and the at least one column of the multi-dimensional structure is parallel to axis selected from axis X and axis Y, differently from the axis of the at least one row. Each cell unit having a lengthwise axis X, and a widthwise axis Y, parallel to the axis X and the axis Y of the multi-dimensional structure. Each cell unit comprises an cell transporting mechanism adapted to transport at least one pallet of the plurality of pallets to and from the cell unit in direction selected from the axis X or the axis Y. Each cell unit further adapted to contain at least one pallet of the plurality of pallets on the same.

c. At least one active shuttle unit moveable between the plurality of cell units of the multi-dimensional structure and is having a lengthwise X axis, and a widthwise axis Y, parallel to the axis X and the axis Y of the multi-dimensional structure. Each shuttle unit comprises a shuttle transporting mechanism adapted to transport at least one pallet of the plurality of pallets to and from one of the plurality of cell units and to and from the at least one shuttle unit in direction selected from the axis X, and the axis Y. The shuttle unit is adapted to enable transportation of at least one pallet of the plurality of pallets from at least one of the cell units to another one of the cell units. Each shuttle unit further adapted to contain at least one pallet of the plurality of pallets on the same.

d. A central controller adapted to control the operation of the cell transporting mechanism and the shuttle transporting mechanism of each one of the cell units and each of the at least one shuttle unit in an independent manner for transporting the plurality of pallets from one predetermined location to another predetermined location within the system.

It is within the scope of the present invention that the operation of each of the cell transporting mechanism of each of the plurality of cell units and each of the shuttle transporting mechanism of each of the at least one shuttle unit is independently performed in the independent manner via the central controller such that a construction of any arrangement of the cell units forming the multi-dimensional structure is performed to effectively exploit the designated space by means of the number of cargo units capable of being inserted and stored within the system.

It is another object of the present invention to provide the modular system as defined above, wherein the shuttle unit comprising a lifting mechanism adapted to lift the at least one pallet of the plurality of pallets in the direction of axis Z of the multi-dimensional structure when the multi-dimensional structure of the cell units comprises more that more than one layer of cell units;

It is another object of the present invention to provide the modular system as defined above, wherein the central controller is adapted to insert and extract at least one of the cargo units to and from a specific cell unit within the system by an arrangement and movement of the plurality of pallets selected from a group consisting of: cyclic movement, linear movement, or any combination thereof; the arrangement and movement of the plurality of pallets is in a direction selected from a group consisting of: the axis X, axis Y, axis Z, or any combination thereof.

It is another object of the present invention to provide the modular system as defined above, wherein the system is a parking system, the cargo units are vehicles, and each cell unit of the plurality of cell units is adapted to contain one vehicle of the vehicles.

It is another object of the present invention to provide the modular system as defined above, wherein the dimensions of the multi-dimensional structure are selected from a group consisting of: 2D, 3D, or any combination thereof.

It is another object of the present invention to provide the modular system as defined above, wherein the system further comprises at least two substantially parallel rails on which the at least one shuttle unit is moveable between the plurality of cell units.

It is another object of the present invention to provide the modular system as defined above, wherein the central controller comprises a set of predetermined algorithms for any possible structure of the multi-dimensional structures; the algorithms are responsible for transporting the plurality of pallets from one predetermined location to another predetermined location along a shortest possible route within the multi-dimensional structure.

It is another object of the present invention to provide the modular system as defined above, wherein the predetermined location is selected from one cell unit of the plurality of cell units or one shuttle unit of the at least one shuttle unit.

It is another object of the present invention to provide the modular system as defined above, wherein the system further comprises at least one entry and at least one exit points; the at least one entry and at least one exit points are selected from one cell unit of the plurality of cell units or one shuttle unit of the at least one shuttle unit.

It is another object of the present invention to provide the modular system as defined above, wherein the cell transporting mechanism and the shuttle transporting mechanism are adapted to transport at least one pallet of the plurality of pallets from one cell unit to its adjacent cell unit in a time interval of between about 7 to about 13 seconds.

It is another object of the present invention to provide the modular system as defined above, wherein the cell transporting mechanism and the shuttle transporting mechanism are adapted to transport at least one pallet of the plurality of pallets from one cell unit to its adjacent cell unit in a time interval of about 10 second.

It is another object of the present invention to provide the modular system as defined above, wherein the one cell unit of the plurality of cell units comprises a rotating mechanism adapted to rotate a pallet located on it in a rotation angle between about 1° to about 360°, clockwise and counter-clockwise.

It is another object of the present invention to provide the modular system as defined above, wherein the at least one shuttle unit comprises a rotating mechanism adapted to rotate a pallet located on it in a rotation angle between about 1° to about 360°, clockwise and counter-clockwise.

It is another object of the present invention to provide the modular system as defined above, wherein the plurality of cell units are at least partially interconnected by mechanically connected means selected from a group consisting of: shafts, rods, axles, bars, balks, staffs, levers, pales, or any combination thereof.

It is another object of the present invention to provide the modular system as defined above, wherein the system is characterized by a characteristic selected from a group consisting of kit-like, LEGO-like, easy for construction, easy for assembly, easy for disassembly, or any combination thereof.

It is another object of the present invention to provide the modular system as defined above, wherein the cell transporting mechanism and the shuttle transporting mechanism comprise rotating wheels adapted to move the at least one pallet by their rotation, such that the at least one pallet of the plurality of pallets is transported to and from one of the plurality of cell units and to and from the at least one shuttle unit.

It is another object of the present invention to provide the modular system as defined above, wherein the operation of the rotating wheels is controlled by the central controller, such that the direction of the rotation of the rotating wheels and the rotation time interval are set.

It is another object of the present invention to provide the method for constructing and operating a modular system for storage of cargo units in a designated space and for effective exploitation of the designated space. The method comprising steps of:

a. Providing a modular system for storage of cargo units in a designated space and for effective exploitation of the designated space, the system comprising: (i) a plurality of pallets, each pallet of the plurality of pallets is adapted to carry at least one cargo unit; (ii) a plurality of active cell units adapted to form a multi-dimensional structure with at least one row and at least one column of storing locations for at least one of the cargo units; the at least one row of the multi-dimensional structure is parallel to the to an axis selected from axis X or axis Y, and the at least one column of the multi-dimensional structure is parallel to axis selected from axis X and axis Y, differently from the axis of the at least one row; each cell unit having a lengthwise axis X, and a widthwise axis Y, parallel to the axis X and the axis Y of the multi-dimensional structure; each cell unit comprising an cell transporting mechanism adapted to transport at least one pallet of the plurality of pallets to and from the cell unit in direction selected from the axis X or the axis Y; each cell unit further adapted to contain at least one pallet of the plurality of pallets on the same; (iii) at least one active shuttle unit moveable between the plurality of cell units of the multi-dimensional structure and is having a lengthwise X axis, and a widthwise axis Y, parallel to the axis X and the axis Y of the multi-dimensional structure; each shuttle unit comprising a shuttle transporting mechanism adapted to transport at least one pallet of the plurality of pallets to and from one of the plurality of cell units and to and from the at least one shuttle unit in direction selected from the axis X, and the axis Y; the shuttle unit is adapted to enable transportation of at least one pallet of the plurality of pallets from at least one of the cell units to another one of the cell units; each shuttle unit further adapted to contain at least one pallet of the plurality of pallets on the same; and, (iv) a central controller adapted to control the operation of the cell transporting mechanism and the shuttle transporting mechanism of each one of the cell units and each of the at least one shuttle unit in an independent manner for transporting the plurality of pallets from one predetermined location to another predetermined location within the system;

b. At least partially interconnecting the active cell units, and thereby forming the multi-dimensional structure.

c. Installing the at least one active shuttle unit between the plurality of cell units of the multi-dimensional structure.

d. Providing at least one cargo unit.

e. Placing the at least one cargo unit one pallet of the plurality of pallets at one predetermined location within the system.

f. Controlling the operation of the cell transporting mechanism and the shuttle transporting mechanism of each one of the cell units and each of the at least one shuttle unit via the central controller in an independent manner.

g. Transporting the at least one pallet of the plurality of pallets to and from at least one of the plurality of cell units and the at least one active shuttle unit via the cell transporting mechanism and the shuttle transporting mechanism of the same.

h. Transporting the at least one cargo unit from the one predetermined location to another predetermined location within the system.

i. Storing the at least one cargo unit within the system.

It is within the scope of the present invention that step (f) of controlling the operation of the cell transporting mechanism and the shuttle transporting mechanism of each one of the cell units and each of the at least one shuttle unit is performed in the independent manner via the central controller, and thereby the system is efficiently exploiting the designated space by means of the number of cargo units capable of being inserted and stored within the system by allowing a construction of any arrangement of the cell units forming the multi-dimensional structure.

It is another object of the present invention to provide the method as defined above, which further comprises step of lifting the at least one pallet of the plurality of pallets via a lifting mechanism in the direction of axis Z of the multi-dimensional structure when the multi-dimensional structure of the cell units comprising more that more than one layer of cell units.

It is another object of the present invention to provide the method as defined above, which further comprises steps of inserting and extracting at least one of the cargo units to and from a specific cell unit within the system via the central controller by arranging and moving the plurality of pallets by an arrangement and movement selected from a group consisting of: cyclic movement, linear movement, or any combination thereof; the arrangement and movement of the plurality of pallets is in a direction selected from a group consisting of: the axis X, axis Y, axis Z, or any combination thereof.

It is another object of the present invention to provide the method as defined above, wherein the system is a parking system, the cargo units are vehicles, and each cell unit of the plurality of cell units is adapted to contain one vehicle of the vehicles.

It is another object of the present invention to provide the method as defined above, wherein the dimensions of the multi-dimensional structure are selected from a group consisting of: 2D, 3D, or any combination thereof.

It is another object of the present invention to provide the method as defined above, wherein the system further comprises at least two substantially parallel rails on which the at least one shuttle unit is moveable between the plurality of cell units.

It is another object of the present invention to provide the method as defined above, which further comprises step of providing the central controller with a set of predetermined algorithms for any possible structure of the multi-dimensional structures; the algorithms are responsible for transporting the plurality of pallets from one predetermined location to another predetermined location along a shortest possible route within the multi-dimensional structure.

It is another object of the present invention to provide the method as defined above, which further comprises step of selecting the predetermined location from one cell unit of the plurality of cell units or one shuttle unit of the at least one shuttle unit.

It is another object of the present invention to provide the method as defined above, which further comprises step of providing the system with at least one entry and at least one exit points; the at least one entry and at least one exit points are selected from one cell unit of the plurality of cell units or one shuttle unit of the at least one shuttle unit.

It is another object of the present invention to provide the method as defined above, wherein the cell transporting mechanism and the shuttle transporting mechanism are adapted to transport at least one pallet of the plurality of pallets in a time interval of between about 7 to about 13 seconds.

It is another object of the present invention to provide the method as defined above, wherein the cell transporting mechanism and the shuttle transporting mechanism are adapted to transport at least one pallet of the plurality of pallets in a time interval of about 10 second.

The method for constructing and operating a modular system for storage of cargo units of claim 18, wherein the one cell unit of the plurality of cell units comprises a rotating mechanism adapted to rotate a pallet located on it in a rotation angle between about 1° to about 360°, clockwise and counter-clockwise.

It is another object of the present invention to provide the method as defined above, wherein the plurality of cell units are at least partially interconnected by mechanically connected means selected from a group consisting of: shafts, rods, axles, bars, balks, staffs, levers, pales, or any combination thereof.

It is another object of the present invention to provide the method as defined above, wherein the system is characterized by a characteristic selected from a group consisting of: kit-like, LEGO-like, easy for construction, easy for assembly, easy for disassembly, or any combination thereof.

It is another object of the present invention to provide the method as defined above, wherein the cell transporting mechanism and the shuttle transporting mechanism comprise rotating wheels adapted to move the at least one pallet by their rotation, such that the at least one pallet of the plurality of pallets is transported to and from one of the plurality of cell units and to and from the at least one shuttle unit.

It is another object of the present invention to provide the method as defined above, wherein the operation of the rotating wheels is controlled by the central controller, such that the direction of the rotation of the rotating wheels and the rotation time interval are set

BRIEF DESCRIPTION OF THE FIGURES

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

Figure 1A:
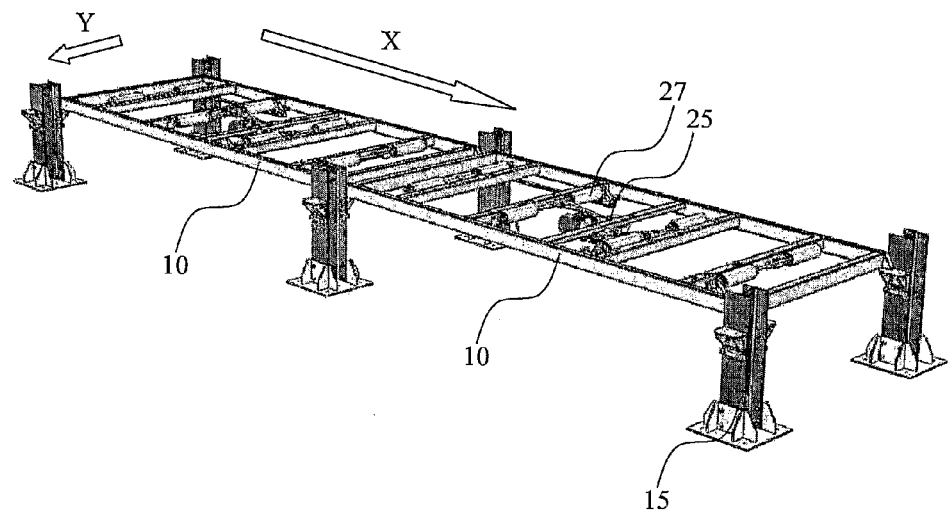
FIGS. 1a-b are a schematic illustration of a specific embodiment of an active cell units of the modular system of the present invention.

The drawings together with the description make apparent to those skilled in the art how the invention may be embodied in practice.

DETAILED DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention discloses a modular system for storage of cargo units in a designated space and for effective exploitation of the designated space. The system comprises:

a. A plurality of pallets. Each pallet of the plurality of pallets is adapted to carry at least one cargo unit.

b. A plurality of at least partially interconnected active cell units forming a multi-dimensional structure with at least one row and at least one column of storing locations for at least one of the cargo units; the at least one row of the multi-dimensional structure is parallel to the to an axis selected from axis X or axis Y, and the at least one column of the multi-dimensional structure is parallel to axis selected from axis X and axis Y, differently from the axis of the at least one row. Each cell unit having a lengthwise axis X, and a widthwise axis Y, parallel to the axis X and the axis Y of the multi-dimensional structure. Each cell unit comprises an cell transporting mechanism adapted to transport at least one pallet of the plurality of pallets to and from the cell unit in direction selected from the axis X or the axis Y. Each cell unit further adapted to contain at least one pallet of the plurality of pallets on the same.

c. At least one active shuttle unit moveable between the plurality of cell units of the multi-dimensional structure and is having a lengthwise X axis, and a widthwise axis Y, parallel to the axis X and the axis Y of the multi-dimensional structure. Each shuttle unit comprises a shuttle transporting mechanism adapted to transport at least one pallet of the plurality of pallets to and from one of the plurality of cell units and to and from the at least one shuttle unit in direction selected from the axis X, and the axis Y. The shuttle unit is adapted to enable transportation of at least one pallet of the plurality of pallets from at least one of the cell units to another one of the cell units. Each shuttle unit further adapted to contain at least one pallet of the plurality of pallets on the same.

d. A central controller adapted to control the operation of the cell transporting mechanism and the shuttle transporting mechanism of each one of the cell units and each of the at least one shuttle unit in an independent manner for transporting the plurality of pallets from one predetermined location to another predetermined location within the system.

The operation of each of the cell transporting mechanism of each of the plurality of cell units and each of the shuttle transporting mechanism of each of the at least one shuttle unit is independently performed in the independent manner via the central controller such that a construction of any arrangement of the cell units forming the multi-dimensional structure is performed to effectively exploit the designated space by means of the number of cargo units capable of being inserted and stored within the system.

The term 'designated space' refers hereinafter to any above ground or underground location and/or structure in which a parking system might be installed (e.g., a parking lot, a carriage of an existing building, a yard, etc.).

The term 'cell units' refers hereinafter to a unit which is adapted to comprise a cargo unit by means of size and shape (see for example FIG. 1a, numerical reference 10).

The term 'pallets' refers hereinafter to a planar object onto which a cargo unit is placed (see for example FIG. 1b, numerical reference 20).

The term 'shuttle unit' refers hereinafter to a cell unit which is transportable (see for example FIG. 6, numerical reference 71).

The term 'cargo units' refers hereinafter to any units which are dimensionally fitter to the system. For example: vehicles, products, boxes, production components, etc.

The term 'lifting mechanism' refers hereinafter to any elevating mechanism known in the art.

The term 'active cell units' refers hereinafter to a cell in which the transporting mechanism is embedded within said cell.

The term 'passive cell units' refers hereinafter to a cell in which the transporting of a cargo is performed via an independent transporting mechanism.

The present invention which is disclosed below is a novel and non-obvious set of standardized aggregates and blocks for the construction of semi-automatic and automatic storage systems (e.g., parking complexes) of various size, form, and designation. The system of the present invention is adapted to accommodate itself to the shape, dimensions, and topography of any available plot of land, and effectively exploits any designated space by means of number of cargo units which can be stored within the system. Moreover, the system is designed in such a way that allows it to increase the speed and space utilization ratio, when compared with other existing systems. For example, the system is able to retrieve at least 40 vehicles per hour stored within it.

The present invention is a kit of standardized and mechanically mutually connectable elements and components which are designed and manufactured in such a way that there is full compatibility of the components with one another. This compatibility is by means of ease of assembly, size, power requirements, management, control, etc.

The system of the present invention is an easy for construction modular system which is: kit-like, LEGO-like, easy for construction, easy for assembly, easy for disassembly, or any combination thereof. These characteristics of the present invention are achieved by an active and an independent manner according to which each main part of the system (e.g., a cell unit or a shuttle unit) is actuated.

The core of the present invention is the ability to use basic components such as: cell units, shuttle units and pallets in order to design, for example, small parking complexes of 4-20 places, medium parking complexes of 21-60 places, as well as large parking complexes of hundreds and thousands of places.

The existing parking systems, part of which is disclosed about suffer from a critical limitation of flexibility in their structure and adaptability to various locations and existing structures. To overcome these limitations, the present invention provides the ability exploit any existing designated space in order to construct a storage system within it.

Figure 1B:
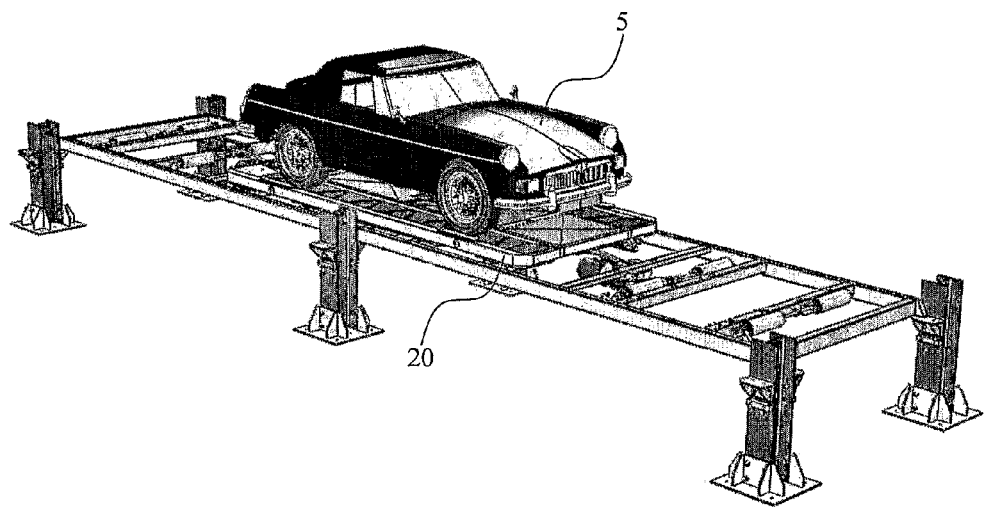

Reference is now made to FIGS. 1a-b, which schematically illustrate a specific embodiment of an active cell units 10 of a modular system 100 (not shown) for storage of cargo units in a designated space 90 (shown in FIG. 6) and for effective exploitation of designated space 90. The active cell units 10 which are connectable to other cell units are the main element of modular system 100. Each cell unit 10 is has a lengthwise axis X, and a widthwise axis Y. For example, as illustrated in FIG. 1a, two cell units 10 are mechanically connected to each other. Each cell unit 10 comprising legs 15 which are adapted to support the cell unit.

According to the preferred embodiment of the present invention, modular system 100 is a parking system, and the cargo units are vehicles. According to this embodiment, each cell unit 10 of the plurality of cell units is adapted to contain one vehicle in the same.

An additional element of system 100 (not shown) is a plurality of pallets. Each pallet 20 of the plurality of pallets is adapted to carry at least one cargo unit. According to the embodiment of FIG. 1b, a cargo unit is a vehicle 5 carried by pallet 20.

According to some embodiments of the present invention, a pallet is a special platform designed to store a vehicle. The vehicle is staying on the pallet until a request by owner or any other authorized person is performed. The pallet is configured to be moved into modular system with or without a vehicle on it. A vehicle is movable within the system only when it is placed on a pallet.

Each cell unit comprising a cell transporting mechanism 25 adapted to contain, carry and transport at least one pallet 20 of the plurality of pallets to and from cell unit 10 in direction selected from axis X or axis Y. As illustrated in FIG. 1b, cell transporting mechanism 25 transports pallet 20 in the direction of axis X.

According to the specific embodiment of the present invention illustrated in FIGS. 1a-b, cell transporting mechanism 25 comprises rotating wheels adapted to move said at least one pallet by their rotation, such that pallet 20 is transported to and from one of said plurality of cell units and to and from said at least one shuttle unit.

Figure 2A:
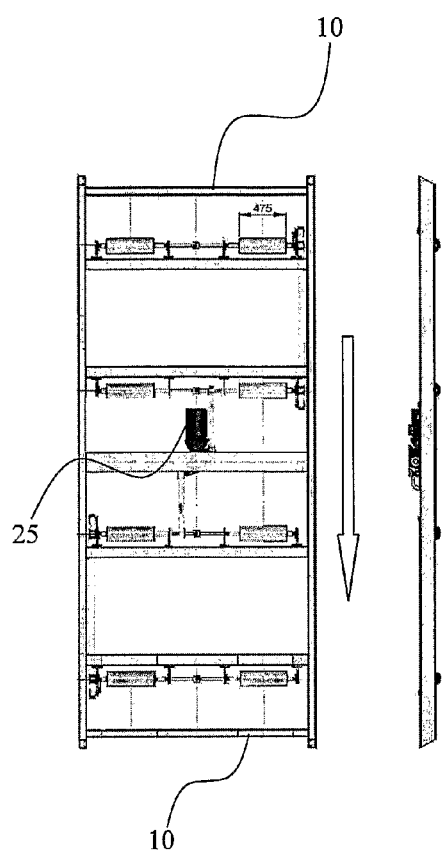
FIGS. 2a-b are a schematic illustration of an upper view of two interconnected cell units.

Reference is now made to FIG. 2a, which schematically illustrates an upper view of two interconnected cell units 10. According to this figure, cell transporting mechanism 25 transports pallet 20 in the direction of axis X. This transport may be in a forward or in a backward direction.

According to different embodiments of the present invention, the cell units are interconnected by mechanically connected means selected from a group consisting of: shafts, rods, axles, bars, balks, staffs, levers, pales, or any combination thereof.

Figure 2B:
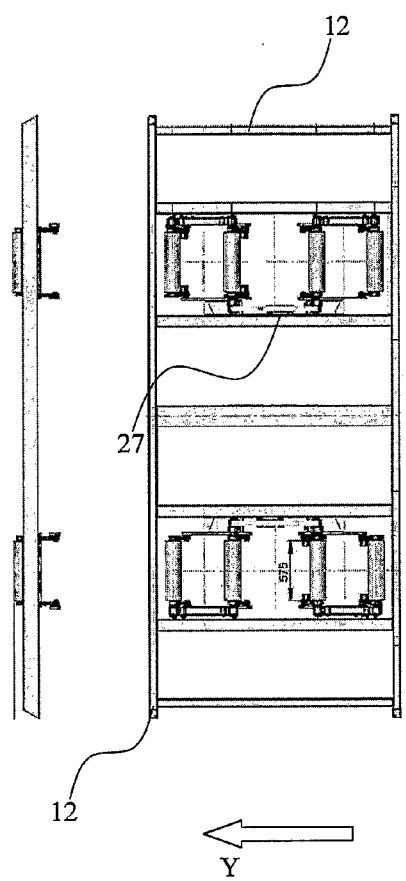

Reference is now made to FIG. 2b, which schematically illustrates an upper view of two interconnected cell units 12. According to this figure, cell transporting mechanism 27 transports pallet 20 (not shown) in the direction of axis Y. This transport may be in a right or a left direction.

Figure 3:
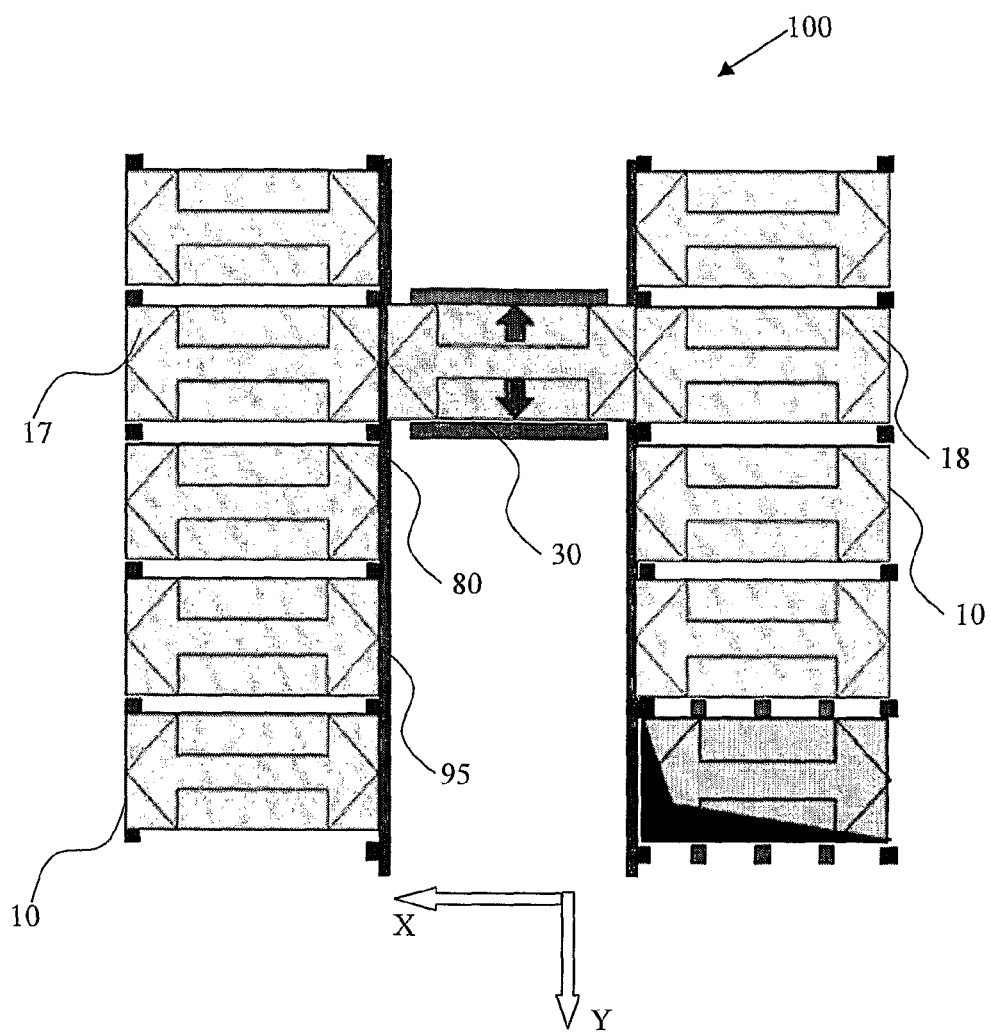
FIG. 3 is a schematic illustration of an example of the modular system of the present invention.

Reference is now made to FIG. 3, which schematically illustrates an example of the modular system 100 of the present invention. In this figure illustrated a plurality of at least partially interconnected active cell units 10 forming a multi-dimensional structure 95 with five rows and two columns of storing locations for at least one of the cargo units. The rows of multi-dimensional structure 95 are parallel to said to axis Y, and the columns of multi-dimensional structure 95 are parallel to axis X. Each one of cell units 10 is having a lengthwise axis X, and a widthwise axis Y, parallel to axis X and axis Y of multi-dimensional structure 95. According to this embodiment, each cell unit 10 is adapted to transport at least one pallet of the plurality of pallets to and from cell unit 10 in direction of axis X. The dimensions of multi-dimensional structure 95 are selected from a group consisting of: 2D, 3D, or any combination thereof.

According to different embodiments of the preset invention, multi-dimensional structure 95 might be: a tower structure, a carousel structure, one level parking system, one level puzzle parking system, multi-level shuttle parking system, multi-level puzzle parking system, multi-level big (shuttle or puzzle) parking system, According to FIG. 3, modular system 100 further comprises shuttle unit 30 which is moveable between the rows of cell units 10, and is adapted to contain, carry and transport. Each shuttle unit 30 is having a lengthwise X axis, and a widthwise axis Y, parallel to axis X and axis Y of multi-dimensional structure 95. Each Shuttle unit comprises a shuttle transporting mechanism (not shown) which is according to a specific embodiment of the present invention is similar to the cell transporting mechanism. The shuttle transporting mechanism is adapted to transport at least one pallet of the plurality of pallets to and from one of the plurality of cell units and to and from shuttle unit in direction selected from axis X, and axis Y. Shuttle unit 30 is adapted to enable transportation of at least one pallet of the plurality of pallets from at least one of said cell units to another one of said cell units. For example, shuttle unit 30 is adapted to transport at least one pallet of the plurality of pallets from cell unit 17 to cell unit 18.

According to a specific embodiment of the present invention, system 100 further comprises two substantially parallel rails 80 on which said shuttle unit is moveable between the cell units 10.

According to a specific embodiment, the shuttle transporting mechanism comprises rotating wheels adapted to move said at least one pallet by their rotation, such that pallet 20 is transported to and from one of said plurality of cell units and to and from said at least one shuttle unit.

The operation of modular system 100 is controlled by a central controller (not shown) which is adapted to control the operation of cell transporting mechanism 25 and shuttle transporting mechanism (not shown) of each one of cell units 10 and each shuttle unit 30 for transporting the plurality of pallets from one predetermined location to another predetermined location within the system. According to different embodiments of the present invention, the predetermined location might be a specific cell unit or a shuttle unit.

An important advantage of the system of the present invention is the ability of the central controller to control the operation of cell transporting mechanism 25 and shuttle transporting mechanism in an independent manner. In other words, and according to a specific embodiment, the central controller is adapted to give each cell transporting mechanism and each shuttle transporting mechanism an order to rotate the rotating wheel for a predetermined period of time, such that the pallet is moved to or from the cell unit or the shuttle unit. The independent manner in which the cell transporting mechanism 25 and shuttle transporting mechanism are controlled, allow a construction of any arrangement of cell units 10 to form multi-dimensional structure 95. The result of this ability provides a modular system which is able to effectively exploit the designated space by means of the number of cargo units capable of being inserted and stored within the system.

Each cell unit or shuttle unit of the present invention is able to connect to any other cell unit or shuttle unit of the system, and for each one of them it does not matter to when the pallets are delivered. What is important for each cell unit or shuttle unit is that the panels are moved to an adjacent cell unit or shuttle unit if they exist. If there is no adjacent cell unit or shuttle unit, the pallets will not be transported from the cell unit or the shuttle unit.

The operation of rotating wheels is controlled by the central controller, such that the direction of the rotation of the rotating wheels and the rotation time interval are set. According to the preferred embodiment of the present invention, the rotation time interval of at least most of the cell units and the shuttle units is substantially the same (due to their similar length).

According to different embodiments, the cell transporting mechanism and the shuttle transporting mechanism comprise a motor adapted to actuate the mechanism by rotating a chain which is connected to the rotating wheels.

According to some embodiments, the cell transporting mechanism and the shuttle transporting mechanism are adapted to transport at least one pallet from one cell unit to its adjacent cell unit in a time interval of between about 7 to about 13 seconds. According to a specific embodiment, this time interval is about 10 second. Due to the active transporting mechanism of each one of the cell units and the shuttle units, this time interval is much shorter that a time interval which could be achieved by a passive transporting mechanism (which takes each pallet and transports it by moving means such as a crane, or a transporting arm).

The central controller of modular system 100 is adapted to insert and extract at least one of said cargo units to and from a specific cell unit within said system by an arrangement and movement of said plurality of pallets selected from a group consisting of: cyclic movement, linear movement, or any combination thereof. The arrangement and the movement of the plurality of pallets is performed in a direction selected from a group consisting of: axis X, axis Y, axis Z, or any combination thereof. For example, shuttle unit 30 of FIG. 3 is adapted to move in a linear movement in the direction of axis Y.

The central controller of the present invention comprises a set of predetermined algorithms for any possible structure of multi-dimensional structure 95. The algorithms are responsible for transporting the plurality of pallets from one predetermined location to another predetermined location along a shortest possible route within multi-dimensional structure 95. This shortest possible route might be the minimal number of transports of the pallets located within the system in order to bring a specific pallet with a specific vehicle on it to a specific location.

According to some embodiments, modular system 100 might further comprise an entry point and an exit point. The entry and the exit points are selected from a cell unit 10 or a shuttle unit 30.

Figure 4:
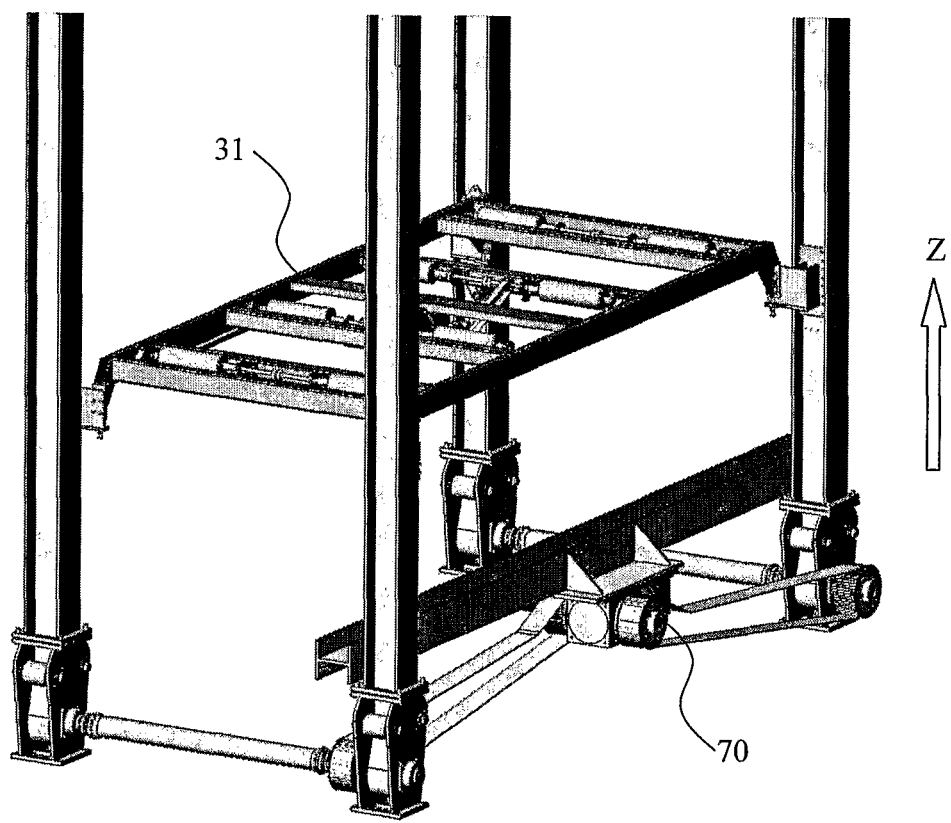
FIG. 4 is a schematic illustration of a specific embodiment of the shuttle unit of present invention.

Reference is now made to FIG. 4 of the present invention which schematically illustrates a specific embodiment of the shuttle unit of present invention. According to this embodiment, shuttle unit 31 comprises a lifting mechanism 70 adapted to lift at least one pallet in the direction of axis Z when multi-dimensional structure 95 of said cell units 10 comprises more than one layer of cell units. The lifting mechanism 70 might by any lifting or elevating mechanism known in the art. The lifting mechanism is preprogrammed to lift a pallet which is located on it (not shown) to a predetermined height, or bring the pallet down to a predetermined height.

It should be mentioned, that according to different embodiment of the present invention, when a cell unit and a shuttle unit are joint (one adjacent to the other), the shuttle unit might be used as a cell unit. Following their separation, the shuttle unit is used again a shuttle and not as a cell.

Figure 5A:
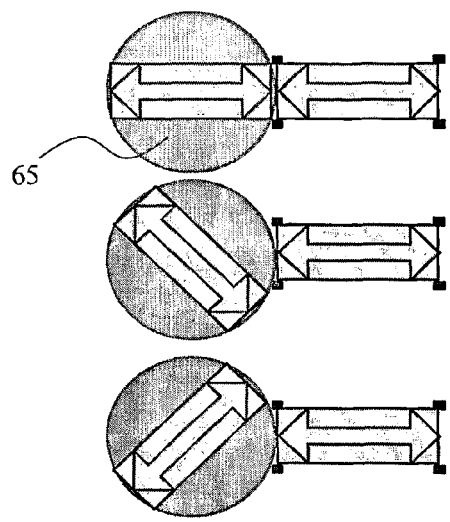
FIGS. 5a-b are a schematic illustration of a specific embodiment of a cell unit with a rotating mechanism.
Figure 5B:
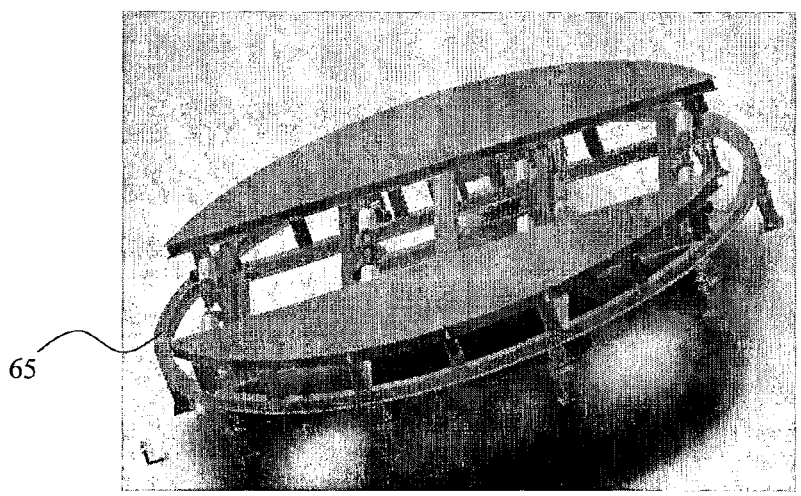

Reference is now made to FIG. 5*a-b* which schematically illustrates a specific embodiment of a cell unit with a rotating mechanism 65. The rotating mechanism is adapted to rotate a pallet located on it in a rotation angle between about 1° to about 360°, clockwise and counter-clockwise. According to other embodiment, a shuttle unit might be provided with a rotating mechanism adapted to rotate a pallet located on it in a rotation angle between about 1° to about 360°, clockwise and counter-clockwise. As presented in FIG. 5*a*, a cell unit with a rotating mechanism or a shuttle unit with a rotating mechanism can be mechanically interconnected to another cell unit or shuttle unit, such that a pallet is transported to and from the cell unit with the rotating mechanism or the shuttle unit with the rotating mechanism.

Reference is now made to FIGS. 6-10, in which the cell units and the shuttle units are adapted to transport the pallets in the direction of axis X.

Figure 6:
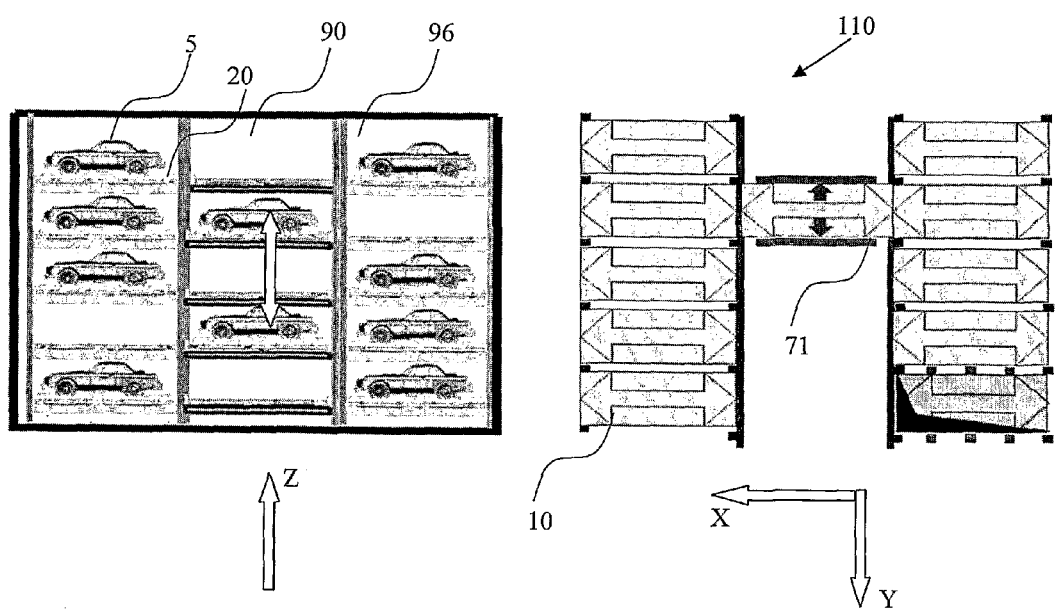
FIG. 6 is schematically illustrates a 3D multi-dimensional structure illustrated a specific embodiment of active cell units of the modular system of the present invention.

In FIG. 6, which schematically illustrates a 3D multi-dimensional structure 96 illustrated a specific embodiment of active cell units 10 of a modular system 110 for storage of cargo units in a designated space 90 and for effective exploitation of designated space 90. The multi-dimensional structure 96 comprises 50 cell units and one shuttle unit with lifting mechanism.

According to FIG. 6, multi-dimensional structure 96 comprises five rows and two columns of storing locations for at least one of the cargo units. The rows of multi-dimensional structure 95 are parallel to said to axis Y, and the columns of multi-dimensional structure 96 are parallel to axis X. Each one of cell units 10 is having a lengthwise axis X, and a widthwise axis Y, parallel to axis X and axis Y of multi-dimensional structure 95. According to this embodiment, each cell unit 10 and the shuttle unit are adapted to transport at least one pallet of the plurality of pallets to and from cell unit 10 in direction of axis X. Moreover, multi-dimensional structure 96 comprises five layers in the direction of axis Z, so that shuttle unit 71 is moveable not only in the direction of axis Y, but also in the direction of axis Z. According to this figure, vehicle 5 which is placed on pallet 20 is transportable to each one of the cell units 10 within multi-dimensional structure 96.

Figure 7:
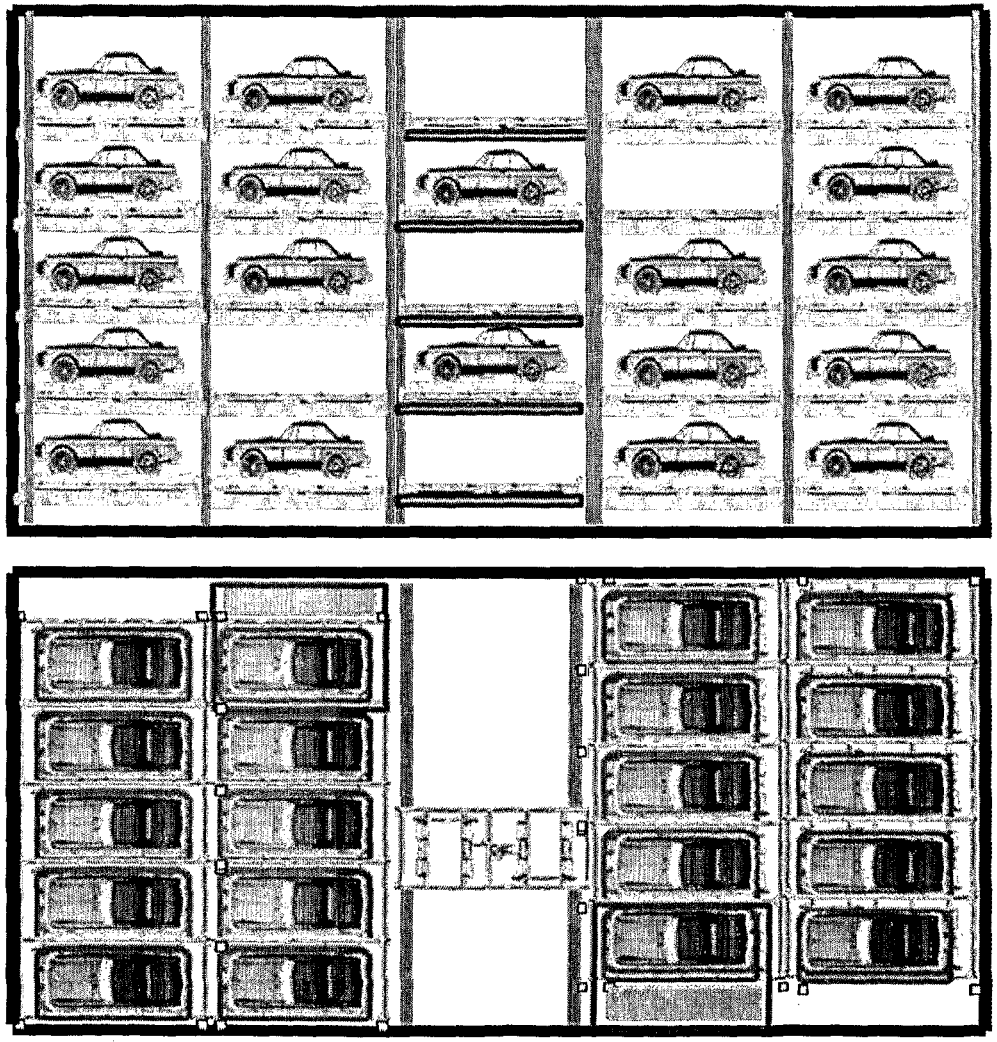
FIG. 7 is a schematic illustration of the modular system of the present invention with one hundred cell units.

Reference is now made to FIG. 7, which schematically illustrates the modular system of the present invention with one hundred cell units. According to this specific embodiment, the multi-dimensional structure is a 3D structure of cell units, fifty cell units in each side of the structure, with a shuttle unit with lifting mechanism therebetween. According to this embodiment, the insertion and the extraction of pallets with vehicles on them is performed by a linear movement and arrangement of the vehicles.

Figure 8A:
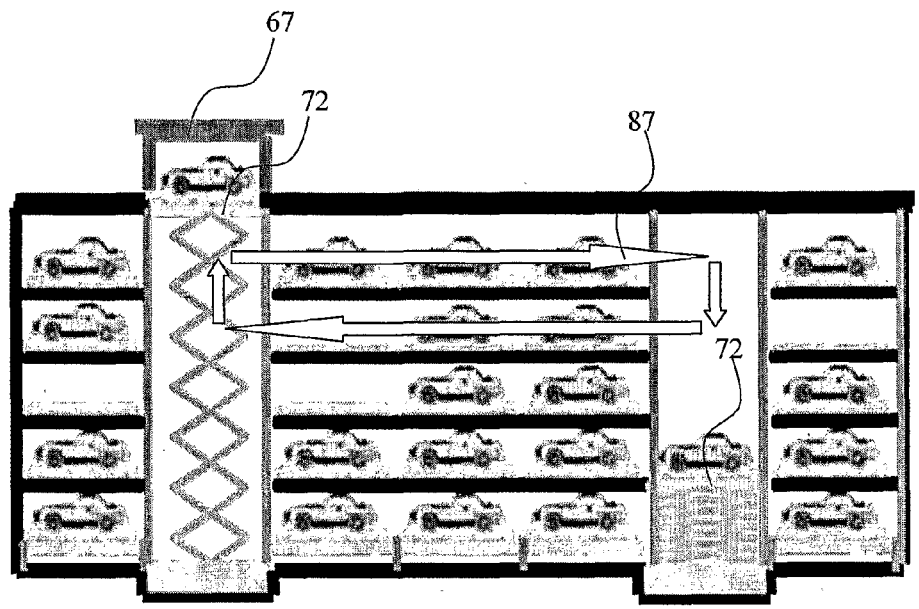
FIG. 8a-b are schematic illustration of the modular system of the present invention with one different numbers of cell units.

Reference is now made to FIG. 8*a*, which schematically illustrates the modular system of the present invention with twenty five cell units. According to this specific embodiment, there is one row of cell units in the direction of axis Y, there are five columns of cell units in the direction of axis X, and there are five layers of cell units in the direction of axis Z. According to this specific embodiment, there are two shuttle units 72 which are moveable between the cell units. The arrangement and movement of the pallets is performed via a combination of linear and circular movements of the pallets as illustrated in arrows 87. This arrangement and movement can also be called as "horizontal carousel". The system illustrated in this figure also comprises box 67 to which a vehicle can enter, and which can protect a vehicle.

According to the specific embodiment illustrated in this figure, box 67 is a part of the system which is adapted to receive a vehicle for storage or for delivering the vehicle to user. When a box is part of the system, the pallet is arriving even into a cell unit (or a shuttle unit) within box 67, and the driver can park the vehicle within the box on the pallet. After this the driver can leave the vehicle, and the system will transport the vehicle to a predetermined cell unit.

Figure 8B:
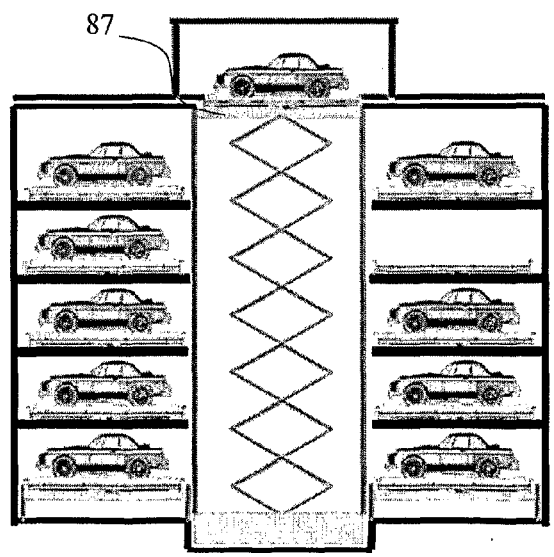

Reference is now made to FIG. 8*b*, which schematically illustrates the modular system of the present invention with ten cell units. According to this specific embodiment, there is one row of cell units in the direction of axis Y, there are two separated columns of cell units in the direction of axis X, and there are five layers of cell units in the direction of axis Z. According to this specific embodiment, there is one shuttle unit 72 with lifting mechanism which is moveable between the layers of the multidimensional structure.

Reference is now made to FIG. 8*b*, which schematically illustrates the modular system of the present invention with ten cell units. According to this specific embodiment, there is one row of cell units in the direction of axis Y, there are two separated columns of cell units in the direction of axis X, and there are five layers of cell units in the direction of axis Z. According to this specific embodiment, there is one shuttle unit 72 with lifting mechanism which is moveable between the layers of the multidimensional structure.

Figure 9A:
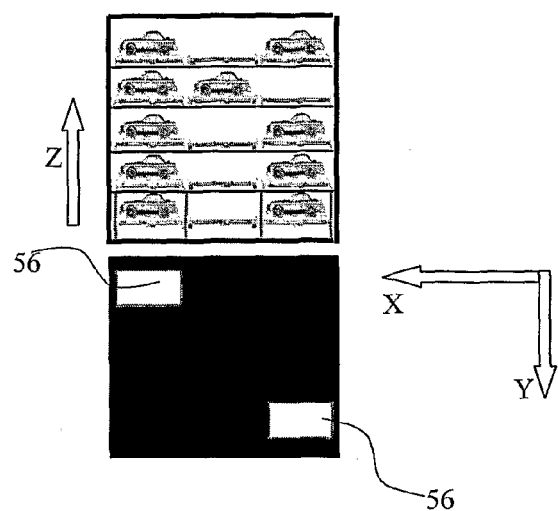
FIG. 9 is a schematic illustration of the modular system of the present invention with forty five cell units.
Figure 9B:
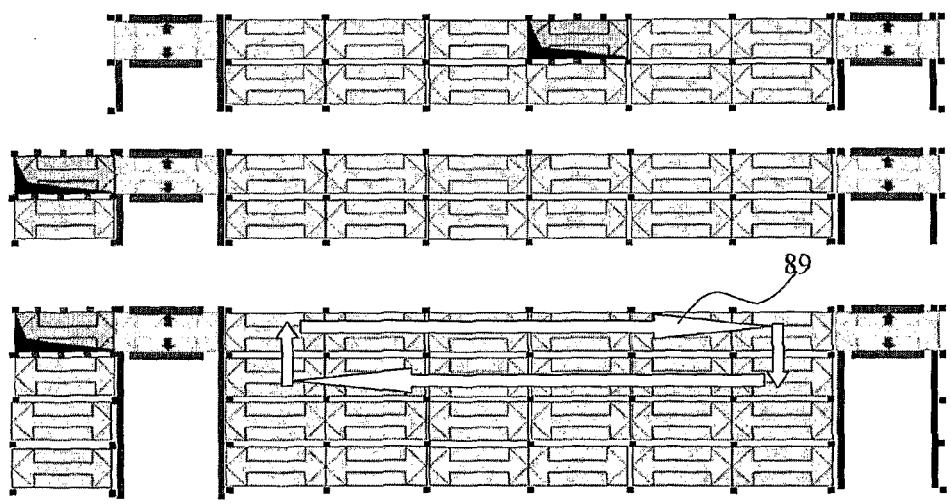

Reference is now made to FIG. 9, which schematically illustrates the modular system of the present invention with forty five cell units. According to this specific embodiment, there are three rows of cell units in the direction of axis Y, there are three columns of cell units in the direction of axis X, and there are five layers of cell units in the direction of axis Z. According to this specific embodiment, there are the shuttle unit with lifting mechanism which is moveable between the layers and the rows of the multidimensional structure and there are two entry and exit points 56.

Figure 10A:
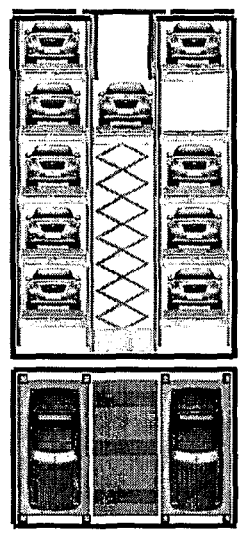
FIGS. 10a-b is a schematic illustration of the modular system of the present invention.

Reference is now made to FIG. 10*a*, which schematically illustrates the modular system of the present invention. According to this figure, the multi-dimensional structure is a 2D structure with different number of interconnected cell units. According to this figure, a vertical (in the X-Y plane) arrangement and movement of vehicles might be performed by two shuttle units as illustrated by arrows 89.

Figures 11A, 11B, 11C:
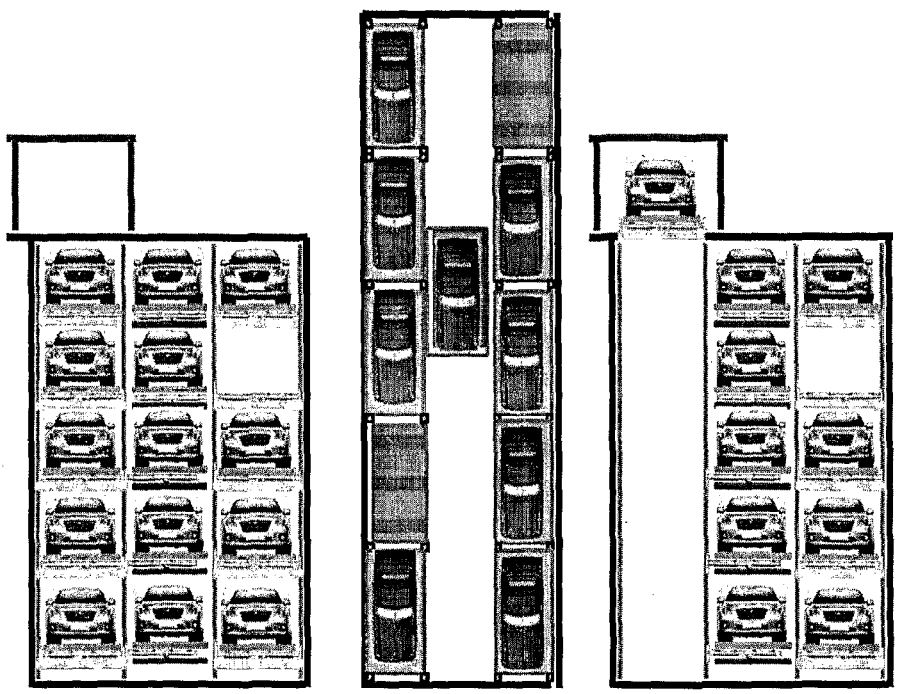
FIGS. 11a-c illustrate different embodiments of the present invention in which the cell units and the shuttle units are adapted to transport the pallets in the direction of axis Y.
Figure 12A:
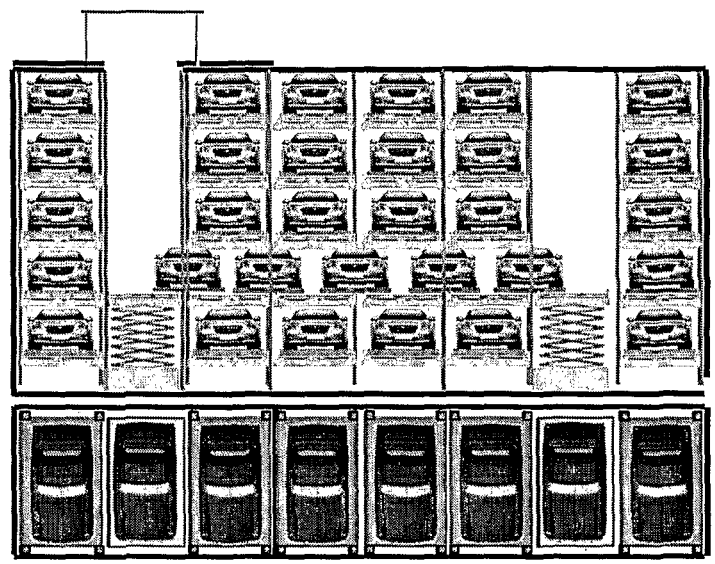
FIGS. 12a-b illustrate different embodiments of the present invention in which the cell units and the shuttle units are adapted to transport the pallets in the direction of axis Y.
Figure 12B:
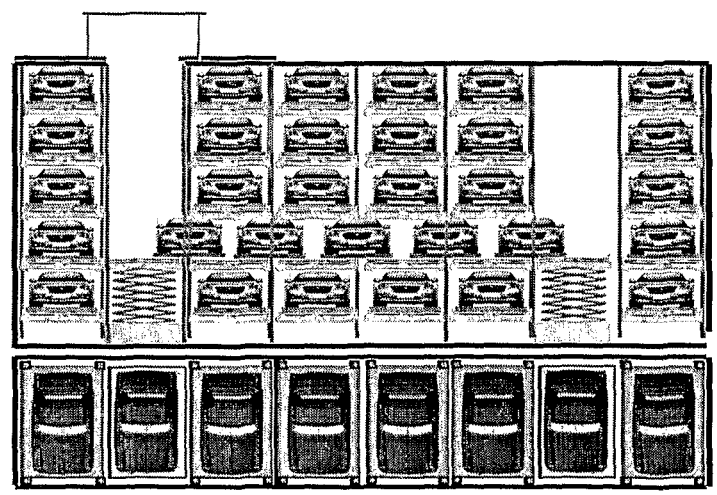

In FIGS. 10-12, illustrated different embodiments of the present invention in which the cell units and the shuttle units are adapted to transport the pallets in the direction of axis Y. In this figures presented 2D and 3D multi-dimensional structures in various embodiments which can be easily understood by a person skilled in the art.

Figure 10B:
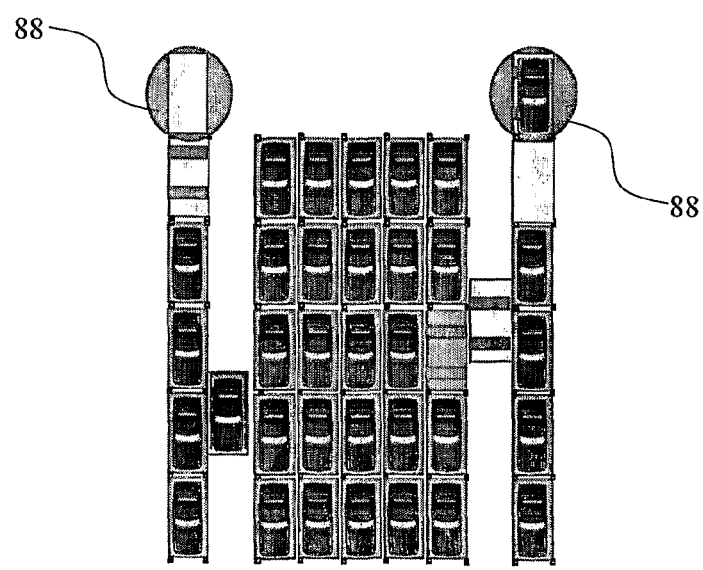

For example, in FIG. 10b, illustrated a 2D multi-dimensional structure of cell units in which there are thirty five cell units for storage of vehicles. The system also comprises two entry/exit cell units with rotating mechanism 88. The embodiment of the present invention also comprises two shuttle units which are moveable between the rows of the multi-dimensional structure.

For another example, in FIGS. 11a-b, illustrated a 3D multi-dimensional structure of cell units in which there are fifty cell units for storage of vehicles with shuttle unit with lifting mechanism. FIG. 11b is an upper view on the system from plane X-Y, and FIG. 11a is a side view on the system from plane Z.

Figure 13A:
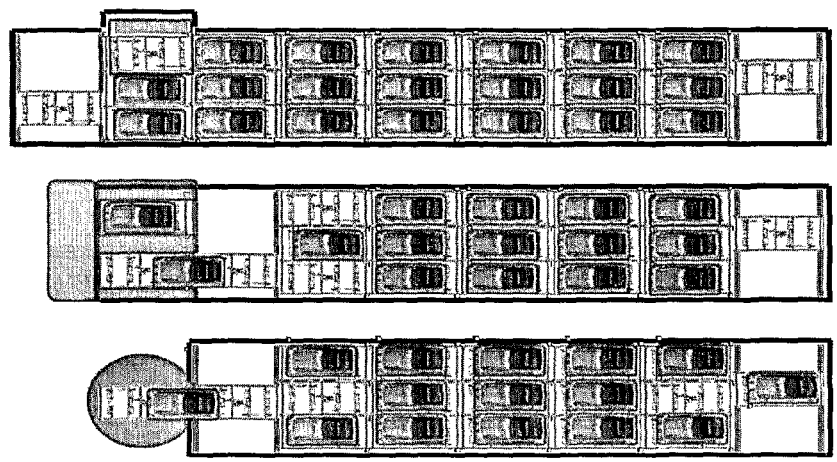
FIGS. 13a-b illustrate different embodiments of the present invention in which the cell units and the shuttle units are adapted to transport the pallets in the direction of axis X.
Figure 13B:
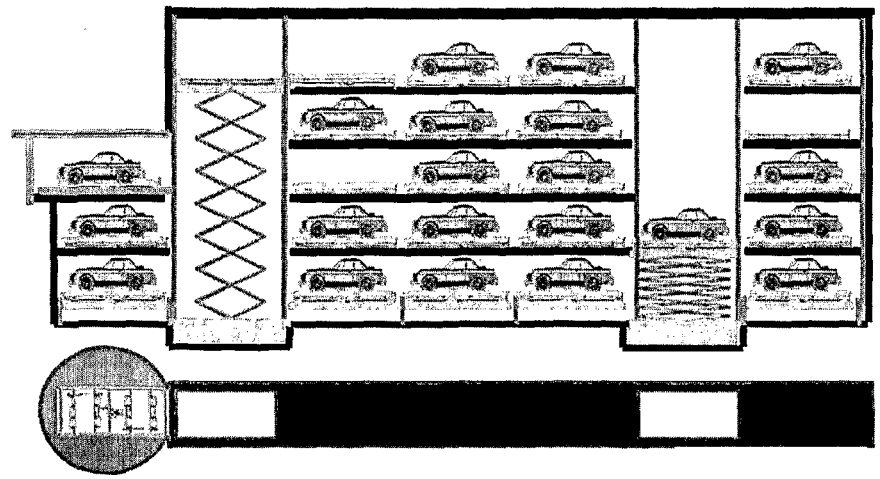
Figure 14A:
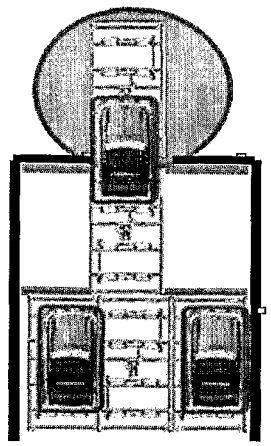
FIG. 14a illustrates a specific embodiment of the present invention in which the cell units and the shuttle units are adapted to transport the pallets in the direction of axis X FIG. 14b exemplary illustrates a picture of the system of the present invention.

In FIGS. 13-14a, illustrated different embodiments of the present invention in which the cell units and the shuttle units are adapted to transport the pallets in the direction of axis X. In this figures presented 2D and 3D multi-dimensional structures in various embodiments which can be easily understood by a person skilled in the art.

Figure 14B:
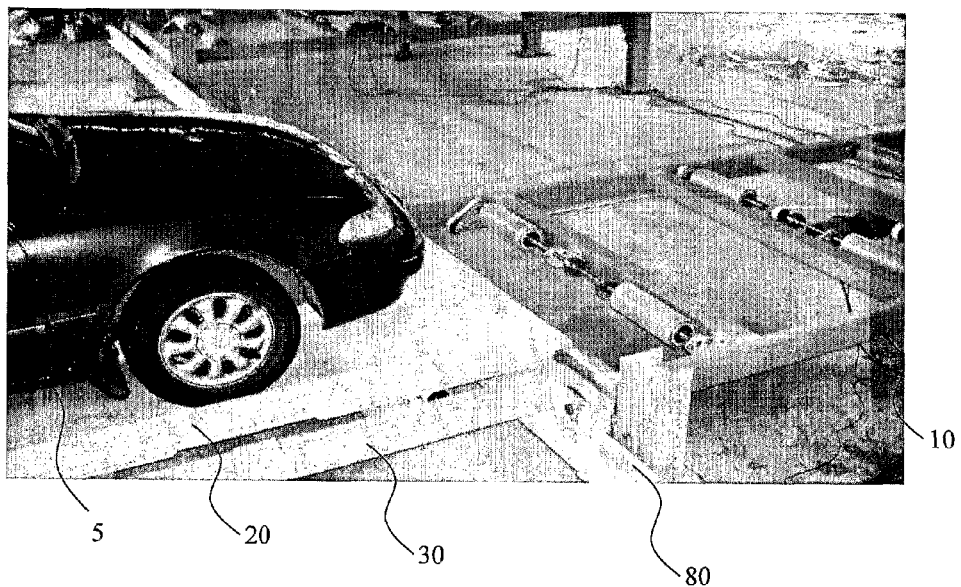

Reference is now made to FIG. 14b which exemplary illustrates a picture of the system of the present invention. According to this picture, shuttle 30 is moveable on rails 80 with pallet 20 which has a vehicle 5 on it.

According to some, embodiments, the system might comprise billing units adapted to manage the billing for the use of the storage locations.

What is claimed is:

1. A modular system for storage of cargo units in a designated space and for effective exploitation of said designated space, said system comprising:
   a. a plurality of pallets, each is adapted to carry at least one cargo unit;
   b. a plurality of at least partially interconnected active cell units forming a multi-dimensional structure with at least one row and at least one column of storing locations for at least one of said cargo units; said at least one row of said multi-dimensional structure is parallel to said to an axis selected from axis X or axis Y, and said at least one column of said multi-dimensional structure is parallel to axis selected from axis X and axis Y, differently from the axis of said at least one row; each cell unit having a lengthwise axis X, and a widthwise axis Y, parallel to said axis X and said axis Y of said multi-dimensional structure; each cell unit comprising a cell transporting mechanism adapted to transport at least one pallet to and from said cell unit in direction selected from said axis X or said axis Y; each cell unit further adapted to contain at least one pallet on the same;
   c. at least one active shuttle unit moveable between said plurality of cell units of said multi-dimensional structure; said-active shuttle unit has a lengthwise X axis, and a widthwise axis Y, parallel to said axis X and said axis Y of said multi-dimensional structure; each shuttle unit comprising a shuttle transporting mechanism adapted to transport at least one pallet of said plurality of pallets to and from one of said plurality of cell units in direction selected from said axis X, and said axis Y; said shuttle unit is adapted to enable transportation of at least one pallet of said plurality of pallets from at least one of said cell units to another one of said cell units; each shuttle unit further adapted to contain at least one pallet of said plurality of pallets on the same; and,
   d. a central controller adapted to control the operation of said cell transporting mechanism and said shuttle transporting mechanism of each one of said cell units and each of said at least one shuttle unit in an independent manner for transporting said plurality of pallets from one predetermined location to another predetermined location within said system;
   wherein the operation of each of said cell transporting mechanism of each of said plurality of cell units and each of said shuttle transporting mechanism of each of said at least one shuttle unit is independently performed in said independent manner via said central controller such that a construction of any arrangement of said cell units forming said multi-dimensional structure is performed to effectively exploit said designated space by means of the number of cargo units capable of being inserted and stored within said system; wherein said one cell unit of said plurality of cell units comprises a rotating mechanism adapted to rotate a pallet located on it in a rotation angle between about 1° to about 360°, clockwise and counter-clockwise;
   wherein said cell transporting mechanism and said shuttle transporting mechanism are adapted to transport at least one pallet of said plurality of pallets from one cell unit to its adjacent cell unit in a time interval of between about 7 to about 13 seconds.

2. The modular system of claim 1, wherein said shuttle unit comprising a lifting mechanism adapted to lift said at least one pallet of said plurality of pallets in the direction of axis Z of said multi-dimensional structure when said multi-dimensional structure of said cell units comprises more that more than one layer of cell units.

3. The modular system of claim 1, wherein said central controller is adapted to insert and extract at least one of said cargo units to and from a specific cell unit within said system by an arrangement and movement of said plurality of pallets selected from a group consisting of: cyclic movement, linear movement, or any combination thereof said arrangement and movement of said plurality of pallets is in a direction selected from a group consisting of: said axis X, axis Y, axis Z, or any combination thereof.

4. The modular system of claim 1, wherein said system is a parking system, said cargo units are vehicles, and each cell unit of said plurality of cell units is adapted to contain one vehicle of said vehicles.

5. The modular system of claim 1, wherein the dimensions of said multi-dimensional structure are selected from a group consisting of: 2D, 3D, or any combination thereof.

6. The modular system of claim 1, wherein said system further comprises at least two substantially parallel rails on which said at least one shuttle unit is moveable between said plurality of cell units.

7. The modular system of claim 1, wherein said system further comprises at least one entry and at least one exit points; said at least one entry and at least one exit points are selected from one cell unit of said plurality of cell units or one shuttle unit of said at least one shuttle unit.

8. The modular system of claim 1, wherein said plurality of cell units are at least partially interconnected by mechanically connected means selected from a group consisting of: shafts, rods, axles, bars, balks, staffs, levers, pales, or any combination thereof.

9. The modular system of claim 1, wherein said system is characterized by a characteristic selected from a group consisting of: kit-like, LEGO-like, easy for construction, easy for assembly, easy for disassembly, or any combination thereof.

10. The modular system of claim 1, wherein said cell transporting mechanism and said shuttle transporting mechanism comprise rotating wheels adapted to move said at least one pallet by their rotation, such that said at least one pallet of said plurality of pallets is transported to and from one of said plurality of cell units and to and from said at least one shuttle unit; further wherein the operation of said rotating wheels is controlled by said central controller, such that the direction of the rotation of said rotating wheels and the rotation time interval are set.

11. The modular system of claim 1, wherein said central controller comprises a set of predetermined algorithms for any possible structure of said multi-dimensional structures; said algorithms are responsible for transporting said plurality of pallets from one predetermined location to another predetermined location along a shortest possible route within said multi-dimensional structure.

12. The modular system of claim 11, wherein said predetermined location is selected from one cell unit of said plurality of cell units or one shuttle unit of said at least one shuttle unit.

13. A method for constructing and operating a modular system for storage of cargo units in a designated space and for effective exploitation of said designated space, said method comprising steps of:
   a. providing a modular system for storage of cargo units in a designated space and for effective exploitation of said designated space, said system comprising: (i) a plurality of pallets, each is adapted to carry at least one cargo unit; (ii) a plurality of active cell units adapted to form a multi-dimensional structure with at least one row and at least one column of storing locations for at least one of said cargo units; said at least one row of said multi-dimensional structure is parallel to said to an axis selected from axis X or axis Y, and said at least one column of said multi-dimensional structure is parallel to axis selected from axis X and axis Y, differently from the axis of said at least one row; each cell unit having a lengthwise axis X, and a widthwise axis Y, parallel to said axis X and said axis Y of said multi-dimensional structure; each cell unit comprising an cell transporting mechanism adapted to transport at least one pallet to and from said cell unit in direction selected from said axis X or said axis Y; each cell unit further adapted to contain at least one pallet on the same; (iii) at least one active shuttle unit moveable between said plurality of cell units of said multi-dimensional structure; said active shuttle unit has a lengthwise X axis, and a widthwise axis Y, parallel to said axis X and said axis Y of said multi-dimensional structure; each shuttle unit comprising a shuttle transporting mechanism adapted to transport at least one pallet of said plurality of pallets to and from one of said plurality of cell units in direction selected from said axis X, and said axis Y; said shuttle unit is adapted to enable transportation of at least one pallet of said plurality of pallets from at least one of said cell units to another one of said cell units; each shuttle unit further adapted to contain at least one pallet of said plurality of pallets on the same; and, (iv) a central controller adapted to control the operation of said cell transporting mechanism and said shuttle transporting mechanism of each one of said cell units and each of said at least one shuttle unit in an independent manner for transporting said plurality of pallets from one predetermined location to another predetermined location within said system;
   b. at least partially interconnecting said active cell units, and thereby forming said multi-dimensional structure;
   c. installing said at least one active shuttle unit between said plurality of cell units of said multi-dimensional structure;
   d. providing at least one cargo unit;
   e. placing said at least one cargo unit one pallet of said plurality of pallets at one predetermined location within said system;
   f. controlling the operation of said cell transporting mechanism and said shuttle transporting mechanism of each one of said cell units and each of said at least one shuttle unit via said central controller in an independent manner,
   g. transporting said at least one pallet of said plurality of pallets to and from at least one of said plurality of cell units and said at least one active shuttle unit via said cell transporting mechanism and said shuttle transporting mechanism of the same;
   h. transporting said at least one cargo unit from said one predetermined location to another predetermined location within said system; and,
   i. storing said at least one cargo unit within said system;
   wherein said step (f) of controlling the operation of said cell transporting mechanism and said shuttle transporting mechanism of each one of said cell units and each of said at least one shuttle unit is performed in said independent manner via said central controller, and thereby said system is efficiently exploiting said designated space by means of the number of cargo units capable of being inserted and stored within said system by allowing a construction of any arrangement of said cell units forming said multi-dimensional structure; wherein said one cell unit of said plurality of cell units comprises a rotating mechanism adapted to rotate a pallet located on it in a rotation angle between about 1° to about 360°, clockwise and counter-clockwise;
   wherein said cell transporting mechanism and said shuttle transporting mechanism are adapted to transport at least one pallet of said plurality of pallets from one cell unit to its adjacent cell unit in a time interval of between about 7 to about 13 seconds.

14. The method for constructing and operating a modular system for storage of cargo units of claim 13, further comprising step of lifting said at least one pallet of said plurality of pallets via a lifting mechanism in the direction of axis Z of said multi-dimensional structure when said multi-dimensional structure of said cell units comprising more that more than one layer of cell units.

15. The method for constructing and operating a modular system for storage of cargo units of claim 13, further comprising steps of inserting and extracting at least one of said cargo units to and from a specific cell unit within said system via said central controller by arranging and moving said plurality of pallets by an arrangement and movement selected from a group consisting of: cyclic movement, linear movement, or any combination thereof; said arrangement and movement of said plurality of pallets is in a direction selected from a group consisting of: said axis X, axis Y, axis Z, or any combination thereof.

16. The method for constructing and operating a modular system for storage of cargo units of claim 13, wherein the dimensions of said multi-dimensional structure are selected from a group consisting of: 2D, 3D, or any combination thereof.

17. The method for constructing and operating a modular system for storage of cargo units of claim 13, wherein said system further comprises at least two substantially parallel rails on which said at least one shuttle unit is moveable between said plurality of cell units.

18. The method for constructing and operating a modular system for storage of cargo units of claim 13, further comprising step of providing said central controller with a set of predetermined algorithms for any possible structure of said multi-dimensional structures; said algorithms are responsible for transporting said plurality of pallets from one predetermined location to another predetermined location along a shortest possible route within said multi-dimensional structure.

19. The method for constructing and operating a modular system for storage of cargo units of claim 13, further comprising step of providing said system with at least one entry and at least one exit points; said at least one entry and at least one exit points are selected from one cell unit of said plurality of cell units or one shuttle unit of said at least one shuttle unit.

20. The method for constructing and operating a modular system for storage of cargo units of claim 13, wherein said plurality of cell units are at least partially interconnected by mechanically connected means selected from a group consisting of: shafts, rods, axles, bars, balks, staffs, levers, pales, or any combination thereof.

21. The method for constructing and operating a modular system for storage of cargo units of claim 13, wherein said system is characterized by a characteristic selected from a group consisting of: kit-like, LEGO-like, easy for construction, easy for assembly, easy for disassembly, or any combination thereof.

22. The method for constructing and operating a modular system for storage of cargo units of claim 13, wherein said cell transporting mechanism and said shuttle transporting mechanism comprise rotating wheels adapted to move said at least one pallet by their rotation, such that said at least one pallet of said plurality of pallets is transported to and from one of said plurality of cell units and to and from said at least one shuttle unit; further wherein the operation of said rotating wheels is controlled by said central controller, such that the direction of the rotation of said rotating wheels and the rotation time interval are set.

* * * * *